(12) United States Patent
Rhrissorrakrai et al.

(10) Patent No.: US 12,437,840 B2
(45) Date of Patent: Oct. 7, 2025

(54) DETERMINING CELL, TISSUE, OR LESION REPRESENTATIONS IN CELL-FREE DNA

(71) Applicant: International Business Machines Corporation, Armonk, NY (US)

(72) Inventors: Kahn Rhrissorrakrai, Woodside, NY (US); Filippo Utro, Pleasantville, NY (US); Chaya Levovitz, New York, NY (US); Laxmi Parida, Mohegan Lake, NY (US)

(73) Assignee: International Business Machines Corporation, Armonk, NY (US)

( * ) Notice: Subject to any disclaimer, the term of this patent is extended or adjusted under 35 U.S.C. 154(b) by 1393 days.

(21) Appl. No.: 16/459,948

(22) Filed: Jul. 2, 2019

(65) Prior Publication Data

US 2021/0005282 A1 Jan. 7, 2021

(51) Int. Cl.
*G16B 25/10* (2019.01)
*C12Q 1/6869* (2018.01)
*G16B 20/00* (2019.01)
*G16B 25/20* (2019.01)
*G16B 30/00* (2019.01)

(52) U.S. Cl.
CPC ........... *G16B 25/10* (2019.02); *C12Q 1/6869* (2013.01); *G16B 20/00* (2019.02); *G16B 25/20* (2019.02); *G16B 30/00* (2019.02)

(58) Field of Classification Search
CPC ........ G16B 25/10; G16B 25/20; G16B 30/00; G16B 20/00; C12Q 1/6869
See application file for complete search history.

(56) References Cited

U.S. PATENT DOCUMENTS

| 9,834,822 B2 | 12/2017 | Talasaz |
| 9,850,523 B1 | 12/2017 | Chudova et al. |
| 2016/0053301 A1 | 2/2016 | Raymond et al. |

(Continued)

OTHER PUBLICATIONS

Kang, S. et al., (2017). CancerLocator: non-invasive cancer diagnosis and tissue-of-origin prediction using methylation profiles of cell-free DNA. Genome biology, 18(1), 53. https://doi.org/10.1186/s13059-017-1191-5. (Year: 2017).*

(Continued)

*Primary Examiner* — Karlheinz R. Skowronek
*Assistant Examiner* — Meredith Abbott Vassell
(74) *Attorney, Agent, or Firm* — Cantor Colburn LLP; Kristofer Haggerty

(57) ABSTRACT

A computer-implemented method includes to determine a cell, tissue or a lesion representation in cell-free DNA comprises inputting, to a processor, cell-free DNA (cfDNA) genomic profiles from one or more fluid biopsy samples from a patient and one or more genomic profiles from one or more cells, tissues or lesions from the patient; constructing, by the processor, a plurality of synthetic fluid hypotheses (SFs); comparing, by the processor, each of the plurality of SFs to the cfDNA genomic profiles to determine goodness of fit, of each of the plurality of SFs; selecting, by the processor, a subset of the plurality of SFs, wherein each SF of the subset of SFs has a minimum distance in goodness of fit compared to the cfDNA genomic profile; and outputting, by the processor, based on the subset of SFs, a cell, tissue or a lesion representation in the cfDNA of the patient.

13 Claims, 7 Drawing Sheets

(56) References Cited

U.S. PATENT DOCUMENTS

| | | |
|---|---|---|
| 2018/0052168 A1 | 2/2018 | Campbell et al. |
| 2018/0202006 A1 | 7/2018 | Kottwitz et al. |
| 2018/0258489 A1 | 9/2018 | Danenberg |
| 2019/0002987 A1 | 1/2019 | Bettegowa et al. |

OTHER PUBLICATIONS

Feng, H., Jin, P., & Wu, H. (2019). Disease prediction by cell-free DNA methylation. Briefings in bioinformatics, 20(2), 585-597. https://doi.org/10.1093/bib/bby029. (Year: 2019).*

Andreica, M. I. (2014). Counting Sets of Lattice Points in the Plane with a Given Diameter under the Manhattan and Chebyshev Distances. Theory and Applications of Mathematics & Computer Science (ISSN: 1221-454X), 4(2), 140-153. (Year: 2014).*

A. LaTorre, J. Pena, S. Gonzalez, V. Robles, F. Famili, 2007. Breast cancer biomarker selection using multiple offspring sampling. In: Proceedings of ECML/PKDD. Workshop on Data Mining in Functional Genomics and Proteomics: Current Trends and Future Directions, Springer Verlag, pp. 23-34. (Year: 2007).*

Garro, B. A., Vazquez, R. A., & Rodríguez, K. (Oct. 2014). Classification of DNA microarrays using artificial bee colony (ABC) algorithm. In International Conference in Swarm Intelligence (pp. 207-214). Springer, Cham. (Year: 2014).*

Oellerich, M., Schütz, E., Beck, J., Kanzow, P., Plowman, P. N., Weiss, G. J., & Walson, P. D. (2017). Using circulating cell-free DNA to monitor personalized cancer therapy. Critical reviews in clinical laboratory sciences, 54(3), 205-218. (Year: 2017).*

Nong, J., et al. (2018). Circulating tumor DNA analysis depicts subclonal architecture and genomic evolution of small cell lung cancer. Nature communications, 9(1), 3114, 1-8. (Year: 2018).*

Rolfo et al., 2014. Liquid biopsies in lung cancer: the new ambrosia of researchers. Biochimica et Biophysica Acta (BBA)-Reviews on Cancer, 1846(2), pp. 539-546. (Year: 2014).*

Palmirotta, R., Lovero, D., Cafforio, P., Felici, C., Mannavola, F., Pellè, E., Quaresmini, D., Tucci, M. and Silvestris, F., 2018. Liquid biopsy of cancer: a multimodal diagnostic tool in clinical oncology. Therapeutic advances in medical oncology, 10:1758835918794630, pp. 1-24. (Year: 2018).*

Chang, Y., Tolani, B., Nie, X., Zhi, X., Hu, M. and He, B., 2017. Review of the clinical applications and technological advances of circulating tumor DNA in cancer monitoring. Therapeutics and clinical risk management, vol. 13, pp. 1363-1374. (Year: 2017).*

Gad Gets et al., "Broad/IBM Project: Discovery of treatment resistance mechanisms through use of liquid biopsy genomics services," Proceedings of the American Association for Cancer Research, AACR, Annual Meeting, 2018, Abstract 3001. 3 Pages.

Hyungjae Lee et al., "A novel strategy for highly efficient isolation and analysis of circulating tumor-specific cell-free DNA from lung cancer patients using a reusable conducting polymer nanostructure," Biomaterials, vol. 101, 2016, pp. 251-257.

Martin H. D. Neumann et al., "ctDNA and CTCs in liquid biopsy-current status and where we need to progress," Computational and Structural Biotechnology Journal, vol. 16, 2018, pp. 190-195.

* cited by examiner

DETERMINING CELL, TISSUE, OR LESION REPRESENTATIONS IN CELL-FREE DNA

BACKGROUND

The present invention generally relates to computing systems, and more specifically, to computer systems, computer-implemented methods, and computer program products configured to electronically implement determination of a cell, tissue or a lesion representation in cell-free DNA.

Blood biopsies are becoming a more prevalent tool to assess and monitor a patient's disease state. These non-invasive biopsies include circulating tumor cells, circulating tumor DNA (ctDNA) from cell-free DNA (cfDNA), and exosomes that are shed from multiple tumor lesions in a single patient. cfDNA can provide information on tumor genetics, tumor burden, and mechanisms of progression and drug resistance.

SUMMARY

Embodiments of the present invention are directed to a computer-implemented method to determine a cell, tissue or a lesion representation in cell-free DNA, the computer-implemented method including: inputting, to a processor, cell-free DNA (cfDNA) genomic profiles from one or more fluid biopsy samples from a patient and one or more genomic profiles from one or more cells, tissues or lesions from the patient, wherein the cfDNA genomic profiles comprise one or more cfDNA genetic markers and their corresponding frequency; constructing, by the processor, a plurality of synthetic fluid hypotheses (SFs), wherein each SF is a hypothetical weighted population per cell, tissue or lesion of the one or more cfDNA genetic markers: comparing, by the processor, each of the plurality of SFs to the cfDNA genomic profiles to determine goodness of fit, of each of the plurality of SFs; selecting, by the processor, a subset of the plurality of SFs, wherein each SF of the subset of SFs has a minimum distance in goodness of fit compared to the cfDNA genomic profile, and outputting, by the processor, based on the subset of SFs, a cell, tissue or a lesion representation in the cfDNA of the patient.

Embodiments of the invention are directed to computer program products and computer systems having substantially the same features of the computer-implemented method described above.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
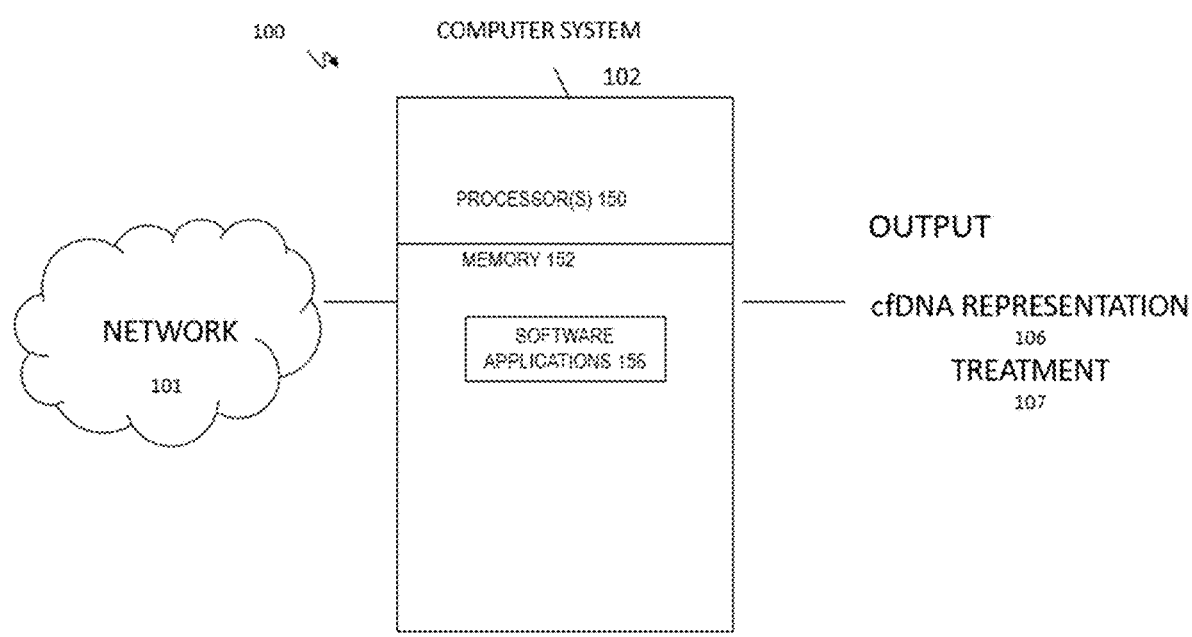
FIG. 1 illustrates a computer system for determining a cell, tissue or a lesion representation in cell-free DNA according to embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the described embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" can be understood to include any integer number greater than or equal to one, i.e. one, two, three, four, etc. The terms "a plurality" can be understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example—"about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, it is known that blood and other liquid biopsies from patients include circulating tumor cells, circulating tumor DNA (ctDNA) from cell-free DNA (cfDNA) and exosomes. For example, lesions are known to "shed" DNA into the blood providing cfDNA. cfDNA can provide information on tumor genetics, tumor burden, and mechanisms of progression and drug resistance. However, as patients tend to have multiple lesions sites, it is a challenge to associate cfDNA with specific lesions sites. Similarly, transplant tissues and chimerically treated cells, for example, also shed cell free DNA into the circulation. What is needed are novel methods for associating cfDNA with specific lesions, cells and tissues, and also to determine differences in DNA shedding patterns according to cell, tissue or lesion phenotype, e.g., responsive, growing, or shrinking tissue, and to provide treatment information based upon the phenotype e.g., responsive, growing, shrinking lesions, could provide valuable treatment information.

The cell, tissue, or lesion representation of cfDNA of the invention can be used to more accurately track response to therapy. For example, longitudinal monitoring can be used to adjust treatment strategies, for example if one lesion type is more resistant than others. Longitudinal monitoring can also reveal which lesions are responsive to treatment and provide valuable information for treatment development including efficacy of drug delivery to different sites or associating specific lesion genetic profiles to their treatment response by measuring their change in cfDNA representation. For example, determining whether or not a patient's specific lesions are more or less likely to be represented in the cfDNA would help doctors to prioritize which lesions require an alternate biopsy type, e.g., a solid tumor biopsy, and spare the patient from biopsy of lesions that are sufficiently represented in a blood biopsy, for example.

In addition, the cell, tissue, or lesion representation of cfDNA determined in accordance with embodiments of the invention can circumvent the many limitations of the Response Evaluation Criteria in Solid Tumors (RECIST) criteria, the current standard way of evaluating progression of disease by monitoring lesion growth. Disadvantages of RESIST include reliance on human measurement, difficulties in measuring non-spherical lesions, and inability to measure small lesions. Embodiments of the invention can evaluate disease on a per lesion level, without a lag-time to accommodate imaging, and also provides the ability to appreciate miniscule DNA shedding that would not be appreciated as lesion size or morphology change at a gross imaging level.

Several definitions are provided.

As used herein, genomic data includes DNA sequence information and/or gene identification. High throughput or next generation sequencing allows for the sequencing of entire genomes using a massively parallel process in which multiple genome fragments are sequenced at once. Sequencing includes, for example mRNA sequencing.

Genomic data includes genetic markers. As used herein, a "genetic marker" is any alteration in a sequence of nucleic acids or other genetic trait that can be detected in a genomic profile from a patient. Genetic markers can be used to identify individuals and populations and to identify genes involved in disease, such as tumor associated genetic markers. Genetic markers include polymorphisms such as single nucleotide polymorphisms.

Genomic data can include identified genes and their variants, as well as expression levels of genes and variants such as log2 expression ratios. Genomic data optionally includes the cancer cell fraction (CCF) which is the fraction of cancer cells with a particular variant, the variant allele frequency (VAF) which is the relative frequency of a variant in a population expressed as a fraction or percentage, and/or the copy number variation (CNV) which is when the number of copies of a particular gene varies.

Turning now to a more detailed description of aspects of the present invention, an implementation of methods performed by, e.g., a computer system 102 depicted in FIG. 1 according to embodiments of the invention will now be described.

More specifically, aspects of the computer-implemented method executed by the system 100 and software application 156 are illustrated in FIG. 1. Genomic data from a cell-free DNA (cfDNA) and profiles from one or more cells, tissues or lesions from the patient are inputted to processor 150. The cell, tissue or a lesion representation in the cfDNA of the patient, is determined e.g., by processor 150 and software applications 156 depicted in FIG. 1. The cell, tissue or a lesion representation in the cfDNA of the patient 106 can be used to determine treatment outcomes 107 for the patient.

The processor 150 executes the software application 156 (depicted in FIG. 1) which includes the model and optional assumptions. The input to the processor 150 in the method is cell-free DNA (cfDNA) genomic profiles from one or more fluid biopsy samples for a patient and one or more genomic profiles from one or more cells, tissues or lesions from the patient, wherein the cfDNA genomic profiles include one or more cfDNA genetic markers and their corresponding frequency.

Figure 2:
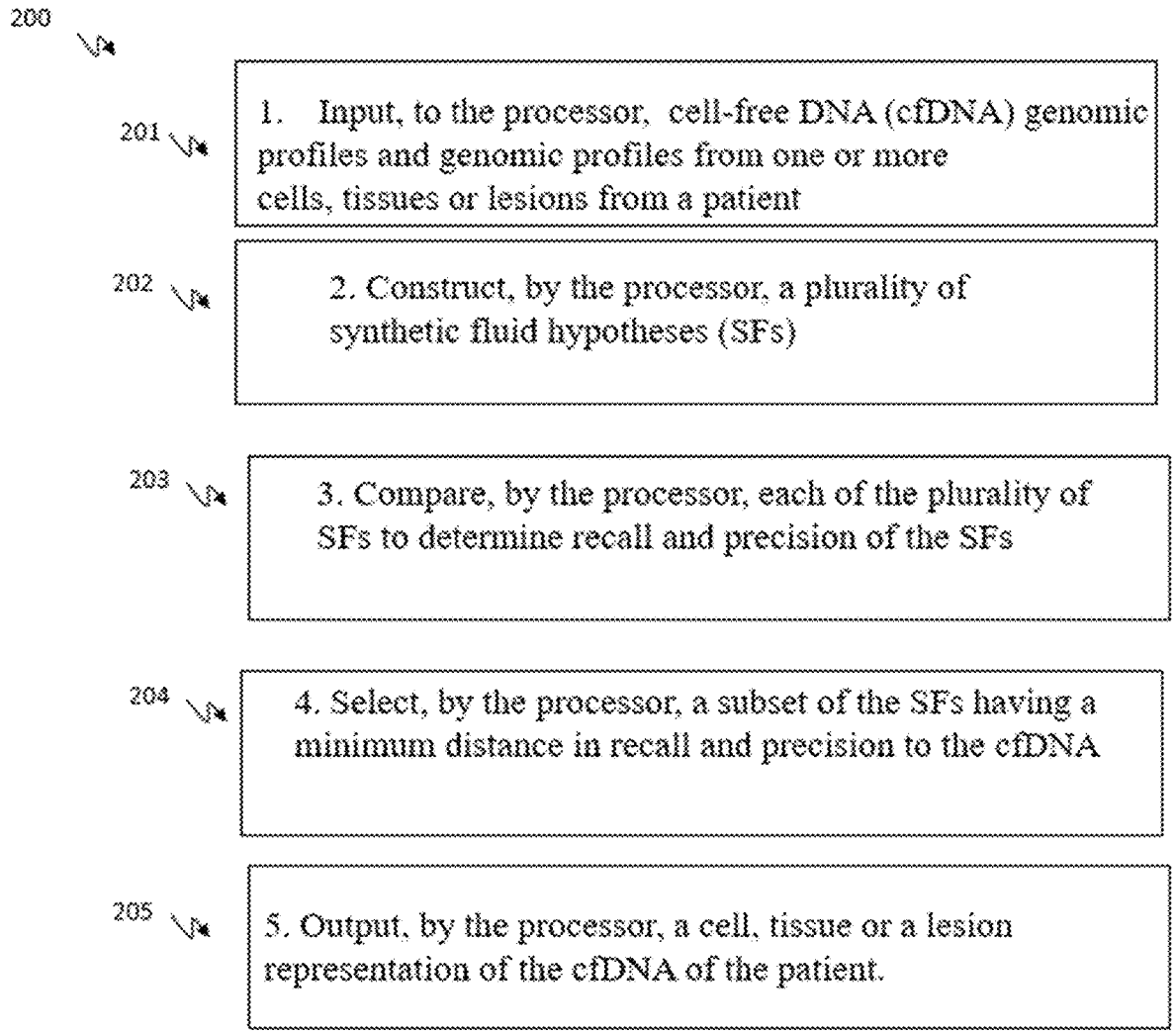
FIG. 2 is a flowchart of a computer-implemented method for determining a cell, tissue or a lesion representation in cell-free DNA according to embodiments of the present invention.

A flow chart of a computer-implemented method 200 implemented by the system 100 (shown in FIG. 1) is detailed below and shown in FIG. 2.

In block 201, the input to the method 200 is cell-free DNA (cfDNA) genomic profiles from one or more fluid biopsy samples from a patient and one or more genomic profiles from one or more cells, tissues or lesions from the patient. The cfDNA genomic profiles include one or more cfDNA genetic markers and their corresponding frequency. The frequency can be the CCF, VAF, or CNV.

In aspects of the invention, the one or more lesions are tumors in different tissues or organs of the patient. In another aspect of the invention, the tissue is a transplanted tissue in the patient. In another aspect of the invention, the cell is a transplanted chimeric cell in the patient.

Exemplary fluid biopsy samples include blood biopsy samples, pleural fluid biopsy samples, and ascitis fluid biopsy samples. In an aspect of the invention, the fluid biopsy sample is a blood biopsy sample.

In block 202, the processor 150 is used to construct a plurality of synthetic fluid hypotheses (SFs), e.g., synthetic blood hypotheses (SBs). Each SF is a hypothetical weighted population per cell, tissue or lesion of the one or more cfDNA genetic markers. While there is no upper or lower limit on the number of SFs, in an aspect of the invention, the plurality of SFs includes 100,000 or more SFs.

In an aspect of the invention, the weights of the SFs are determined by a random process using, for example, a Dirichlet process. Such a method includes, for example, generating, by the processor, a plurality of random alphas, wherein each alpha represents the contribution of the one or more cells, tissues or lesions in the fluid biopsy sample. The method then includes inputting the plurality of alphas, by the processor 150, to a random distribution function and generating, by the processor, a weight for each of the one or more cell, tissue or lesion genetic markers. This process can be a Dirichlet process. Each genetic marker in the SF can then be represented as a sum of its weighted frequency. However, in order to reduce noise, the method includes discarding by the processor, cell, lesion or tissue genetic markers having a frequency less than a set values, such as less than 0.6. The method then includes constructing, by the processor, the SFs, and augmenting, by the processor, the SFs with genetic markers found exclusively in the cfDNA genomic profile.

In an aspect of the invention, generating, by the processor 150, a weight for each of the one or more cfDNA genetic markers, further includes assigning the weights from discrete intervals, e.g. from low, medium and high frequency bins. Each alpha is associated with the low, medium or high frequency bin and then specifically associated to a random weight from within the interval range of that bin. For example, if an alpha is assigned to a low bin, and the range of the low bin is 0-0.1, the alpha can be assigned a random value between 0 and 0.1. These discrete intervals may range from but are not limited to 3-20 bins which each bin having its own interval range. Exemplary interval ranges include ranges such as for example 0.2-0.65, or the interval ranges can be discrete values such as 0.5, such that the range is 0.5-0.5.

Mathematically, the process of constructing the plurality of SFs by the processor 105, can be described as follows:

a. SF=[S($g_1$), S($g_N$) . . . . S($g_N$)]
b. S(g)=$\Sum_{l \in L} w_l C_{g,l}/L$
 i. The CCF (C) of the mutation in the synthetic fluid is the weighted average of the CCF from the different lesions (L)
 ii.

$$w = \begin{cases} Dir(\alpha = [lowRange]), rand < lowThd \\ Dir(\alpha = [highRange]), rand \geq highThd \\ Dir(\alpha = [midRange]), lowThd \geq rand < highThd \end{cases}$$

1. lowRange=[0.0, 0.3]
2. highRange=[0.6, 1.0]
3. midRange=[0.3, 0.6]

c. SF is augmented with mutations exclusive to the real fluid samples at their observed frequency, e.g., CCF.

Figure 4:
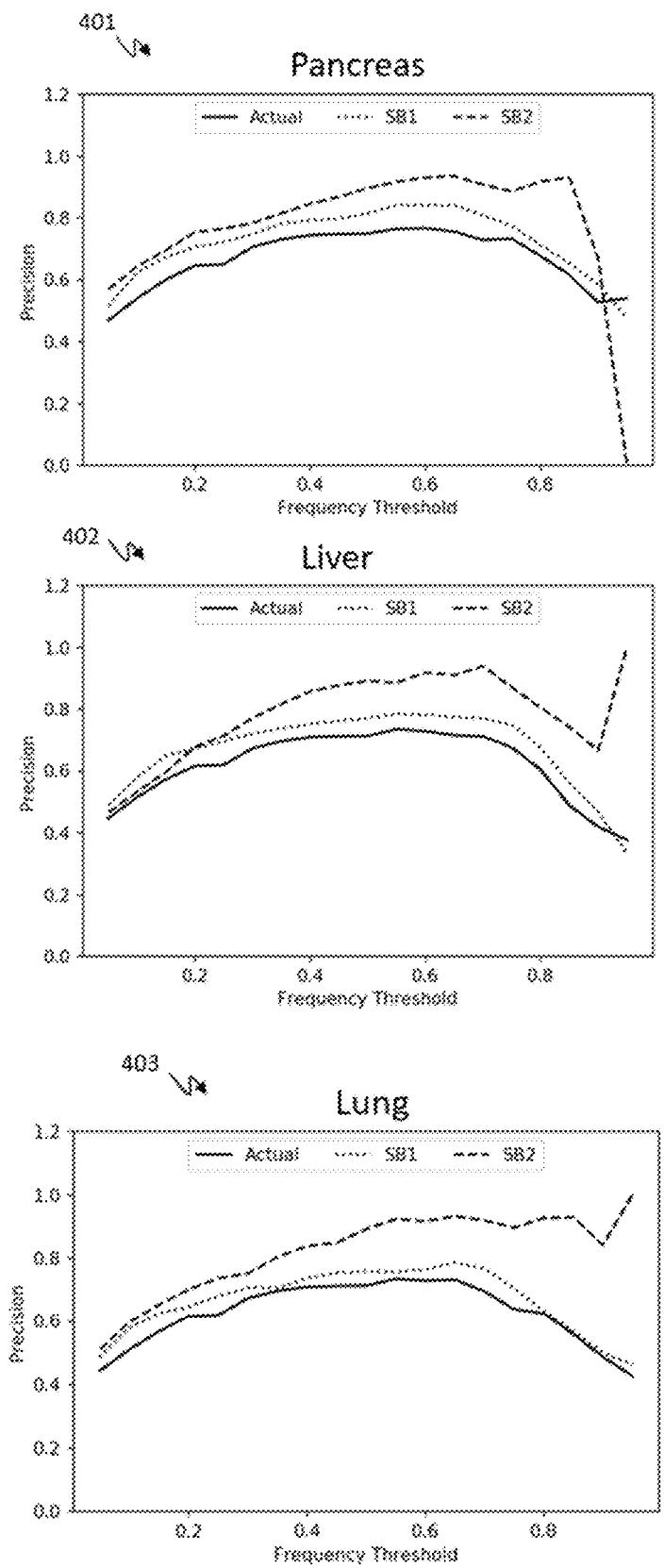
FIG. 4 depicts exemplary synthetic fluid, e.g., synthetic blood, precision curves according to aspects of the invention for lesions in the pancreas, liver, and lung for a patient.

In block 203, the processor 150 is used to compare each of the plurality of SFs to the cfDNA genomic profiles to determine the goodness of fit of each of the plurality of SFs. The goodness of fit can be assessed in a multiplicity of ways including but not limited to recall, precision, accuracy, specificity, F1, and Jaccard distance. Here we describe the usage of recall and precision. The recall and precision of the SFs can be determined by considering L-infinity and L1 distances in recall and precision curves when selecting the subset of SBs. Example 1 and FIG. 4 provide exemplary SB precision curves for lesions in pancreas 401, liver 402 and lung 403 for a patient.

In an aspect of the invention, using the processor 150 to compare each of the plurality of SFs to the cfDNA genomic profiles to determine recall and precision of each of the plurality of SFs includes applying, by the processor, distances with respect to recall and precision curves for the representation of the one or more cfDNA genetic markers in the plurality of SFs, and repeating, by the processor 150, the applying, 1 to 4 times.

Mathematically, the process of using recall and precision curves by the processor 150, can be described as follows:
a.

$$\text{For precision } (SB, l) = \sum_{c \text{ in } [0.05, 0.95]} \frac{m(l, 0.6) \cap m(SB, c)}{m(SB, c)}$$

b.

$$\text{For recall } (SB, l) = \sum_{c \text{ in } [0.05, 0.95]} \frac{m(l, 0.6) \cap m(SB, c)}{m(l, 0.6)}$$

c. m(l,c)=total # genes in l≥c

Figure 5:
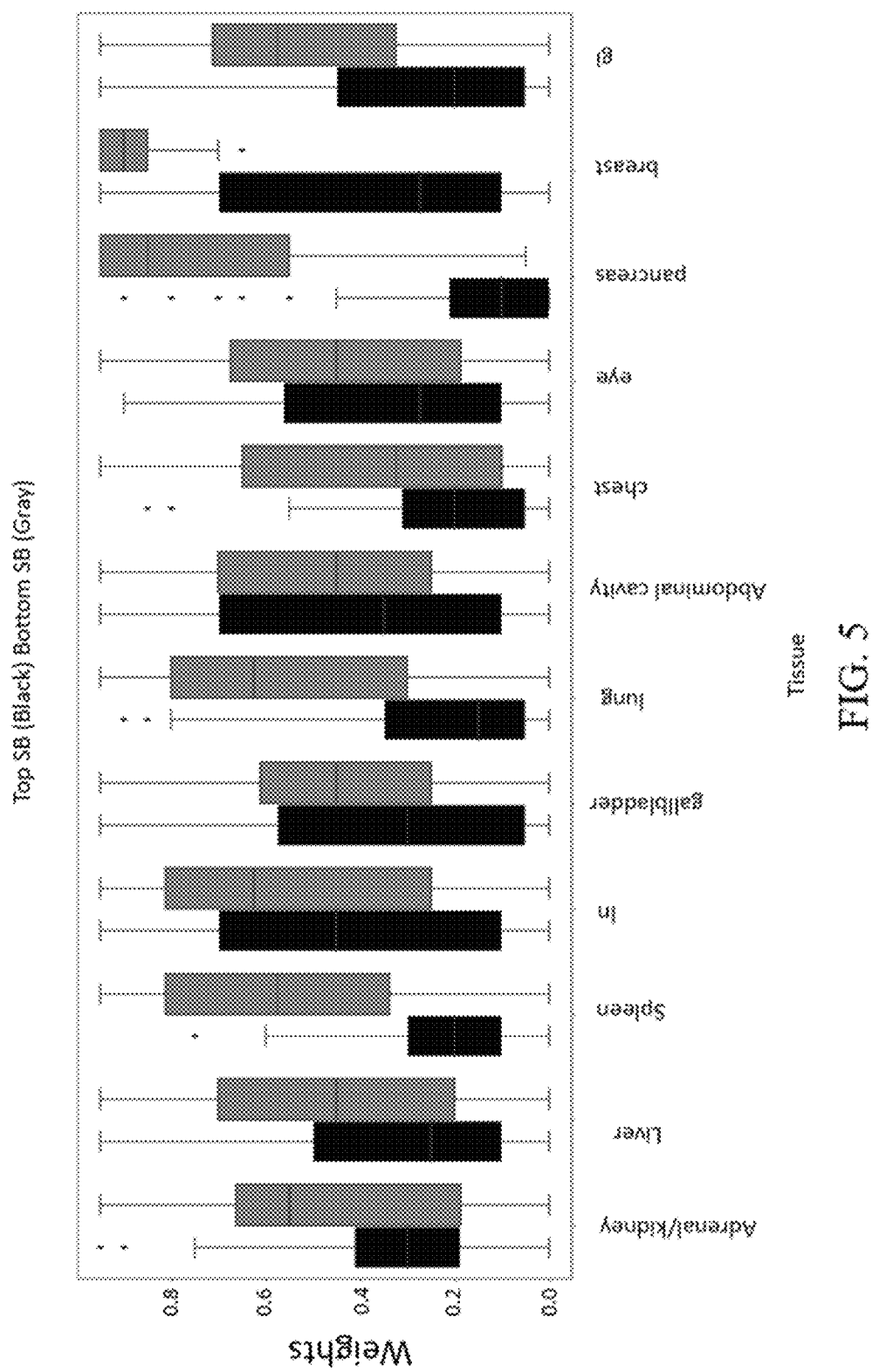
FIG. 5 depicts the top and bottom 5% of results for the SB curves according to aspects of the invention for various tissues from a population of patients.

In block 204, the processor 150 is used to select a subset of the plurality of SFs, wherein each SF of the subset of SFs has a minimum distance in recall and precision compared to the cfDNA genomic profile. The subset of SFs includes 10 to 500 SFs, or the top 1% to 10% of SFs having the minimum distance in recall and precision compared to the cfDNA genomic profile. Example 2 and FIG. 5 illustrate the top and bottom 5% of results for the data from a population patients for various tissues.

Mathematically, goodness of fit can be determined by the processor 105 by:
a. L-infinity distance
b. L1 distance $$\text{score } (SB, \text{metric}) = \frac{\sum_{l \in L} dist(\text{metric}(SB, l))}{L}$$

In block 205, the processor 150 outputs based on the subset of SFs, a cell, tissue or a lesion representation in the cfDNA of the patient.

In an aspect of the invention, the method 200 further includes repeating, by the processor 150, the method 200 to provide a plurality of cell, tissue or a lesion representations in the cfDNA of a plurality of patients, and determining, by the processor 150, from the lesion representation in the cfDNA of a plurality of patients, a likelihood of cell, tissue or lesion representation of an identified cfDNA genetic marker. Example 2 provides an example of an analysis of a plurality of tumors across a plurality of patients. The likelihood of cell, tissue or lesion representation of an identified cfDNA genetic marker can be used to guide treatment of an individual patient, e.g., cancer treatment.

In another aspect of the invention, the cell, tissue or lesion representations of the cfDNA of the invention allow a physician to assess patient response to therapy prior to the standard "assessment grace period" allotted for imaging response evaluation. A exemplary assessment grace period is several weeks to 6 months, such as 3 months, during which time the physician waits for changes in the tumor bulk to be appreciable upon imaging. In addition, because imaging measurements are not accurate and any measurements have an associated error, response criteria (RECIST) stimulates a particular response to be determined. The method of the invention does not have the same error and smaller changes can be detected without the percentage thresholds required by imaging methods.

In another aspect of the invention, often the initial response of a lesion cannot be captured by imaging (i.e., too small to be imaged through CT and MRI, and can be mislabeled as stable disease). The methods of the invention can be used to reveal true lesion response and influence a treatment plan for the subject.

In another aspect of the invention, the cell, tissue or lesion representations of the cfDNA of the invention allows physicians to monitor patients in "real time" for response at a lesion level which eliminates the requirements for expensive, radiation-producing, time-consuming imaging which is still the standard way of response/disease progression monitoring.

Thus, in a method in accordance with embodiments of the invention, the one or more fluid samples for the patient include a first and a second fluid samples for the patient, wherein the first fluid sample is taken at a first time and the second fluid sample is taken at a second time; and the method includes determining, by the processor, a first time cell, tissue or a lesion representation in the cfDNA of the patient and a second time cell, tissue or a lesion representation in the cfDNA of the patient according to the method of claim 1; and comparing, by the processor, the first time representation to the second time representation to provide a time-dependent change in the cfDNA of the patient.

The time-dependent change can be used to determine, by the processor 150, a phenotype of a cell, tissue or lesion in the patient; a priority cell, tissue or lesion biopsy; a treatment response of the patient. Based on the phenotype, priority biopsy or treatment response, the method can include determining, by the computer, a further treatment for the patient.

In an aspect of the invention, the treatment is a cancer treatment. Exemplary cancer treatments include administration of a chemotherapeutic agent, radiation therapy, surgery, chemotherapy, targeted therapy, hormone therapy, immunotherapy, stem cell transplant, or a combination including at least one of the foregoing.

In an aspect of the invention, the method can further include comparing, by the processor, genomic data for a new patient subjected to the cancer treatment with the common feature for the plurality of subjects, and if the new patient genomic data shares the common feature, determining that the new subject and the plurality of subjects have a same mechanism of response to the cancer treatment. The method optionally further includes determining, by the computer, a further treatment for the new patient based upon the mechanism of response to the cancer treatment. The further cancer treatment can then be administered to the subject.

Exemplary further cancer treatments include administering a signal transduction pathway inhibitor, an antimetabolite, an antimicrotubule agent, an alkylating agent, a nitrogen mustard, a nitrosourea, a platinum agent, an anthracycline, an antibiotic, a topoisomerase inhibitor, an alkyl sulfonate, a triazine, an ethyenimine, a folic acid analog, a pyrimidine analogue, a purine analog, an antitumor antibiotic, a hormone, an anti-angiogenic agent, an immunotherapeutic agent, a cell cycle signaling inhibitor, or a combination including one or more of the foregoing.

More specifically, further treatment thus include signal transduction pathway inhibitors (e.g., ErbB inhibitors, EGFR inhibitors such as erlotinib), antimetabolites (e.g., 5-fluoro-uracil, methotrexate, fludarabine), antimicrotubule agents (e.g., vincristine, vinblastine, taxanes such as paclitaxel, docetaxel), an alkylating agent (e.g., cyclophosphamide, melphalan, biochoroethylnitrosurea, hydroxyurea), nitrogen mustards, (e.g., mechloethamine, melphan, chlorambucil, cyclophosphamide and Ifosfamide); nitrosoureas (e.g., carmustine, lomustine, semustine and streptozocin), platinum agents (e.g., cisplatin, carboplatin, oxaliplatin, JM-216, C 1-973), anthracyclines (e.g., doxrubicin, daunorubicin), antibiotics (e.g., mitomycin, idarubicin, adriamycin, daunomycin), topoisomerase inhibitors (e.g., etoposide, camptothecins), alkyl sulfonates including busulfan; triazines (e.g., dacarbazine); ethyenimines (e.g., thiotepa and hexamethylmelamine); folic acid analogs (e.g., methotrexate); pyrimidine analogues (e.g., 5 fluorouracil, cytosine arabinoside); purine analogs (e.g., 6-mercaptopurine, 6-thioguanine); antitumor antibiotics (e.g., actinomycin D; bleomycin, mitomycin C and methramycin); hormones and hormone antagonists (e.g., tamoxifen, cortiosteroids), anti-angiogenic agents (bevacizumab, endostatin and angiostatin), immunotherapeutic agents (transfection with cytokines such as interleukin 2, interleukin 4 or granulocyte-macrophage colony stimulating factor), cell cycle signaling inhibitors (CDK2, CDK4, and CDK6 inhibitors) and any other cytotoxic agents, (e.g., estramustine phosphate, prednimustine).

For example, signal transduction inhibitors include inhibitors of receptor tyrosine kinases, non-receptor tyrosine kinases, SH2/SH3 domain blockers, serine/threonine kinases, phosphotidyl inositol-3 kinases, myo-inositol signaling, and Ras oncogenes. Growth factor receptor tyrosine kinases include, for example, epidermal growth factor receptor (EGFr), platelet derived growth factor receptor (PDGFr), erbB2, erbB4, ret, vascular endothelial growth factor receptor (VEGFr), tyrosine kinase with immunoglobulin-like and epidermal growth factor homology domains (TIE-2), insulin growth factor-I (IGFI) receptor, macrophage colony stimulating factor (cfms), BTK, ckit, cmet, fibroblast growth factor (FGF) receptors, Trk receptors (TrkA, TrkB, and TrkC), ephrin (eph) receptors, and the RET protooncogene. Tyrosine kinases, which are not growth factor receptor kinases are termed non-receptor tyrosine kinases. Non-receptor tyrosine kinases include cSrc, Lck, Fyn, Yes, Jak, cAbl, FAK (Focal adhesion kinase), Brutons tyrosine kinase, and Bcr-Abl.

Inhibitors of Serine/Threonine Kinases include MAP kinase cascade blockers which include blockers of Raf kinases (rafk), Mitogen or Extracellular Regulated Kinase (MEKs), and Extracellular Regulated Kinases (ERKs); and the Protein kinase C family member blockers including blockers of PKCs (alpha, beta, gamma, epsilon, mu, lambda, iota, zeta). IkB kinase family (IKKa, IKKb), PKB family kinases, akt kinase family members, and TGF beta receptor kinases.

Inhibitors of Phosphotidyl inositol-3 Kinase family members including blockers of PI3-kinase, ATM, DNA-PK, and Ku.

Inhibitors of Ras Oncogene include inhibitors of farnesyltransferase, geranyl-geranyl transferase, and CAAX proteases as well as anti-sense oligonucleotides, ribozymes and immunotherapy.

Alkylating agents alkylate molecules such as proteins, RNA and DNA and can covalently bind these molecules.

Alkylating agents affect any point in the cell cycle and thus are known as cell cycle-independent drugs.

Antimetabolites impede DNA and RNA synthesis.

Anti-microtubule agents block cell division by preventing microtubule function.

In an aspect of the invention, a computer program product to determine a cell, tissue or a lesion representation in cell-free DNA includes a computer readable storage medium having program instructions embodied therewith, the program instructions executable by a processor to cause the processor to perform operations as described above in the computer-implemented method.

In another aspect of the invention, a system for to determine a cell, tissue or a lesion representation in cell-free DNA includes: a processor; and a computer readable storage medium storing including executable instructions that, when executed by the processor, cause the processor to perform operations as described above in the computer-implemented method.

FIG. 1 depicts a system 100 according to embodiments of the invention. Network 101 and computer system 102 can be used to store and communicate cell-free DNA (cfDNA) genomic profiles and genomic profiles from one or more cells, tissues or lesions from a patient, to construct a plurality of SFs, to select a subset of SFs having a minimum of distance in recall and precision to the cfDNA, and to output a cell, tissue or lesion representation of the cfDNA of the patient 106. The cell, tissue or lesion representation of the cfDNA of the patient 106 can be used to make a treatment decision 107 which can then be administered to a patient. The computer system 102 includes one or more processors 150, memory 152, and one or more software applications 156 having computer-executable instructions to function as discussed herein. The processors 150 are configured to the execute computer-executable instructions of the software applications 156.

Figure 3:
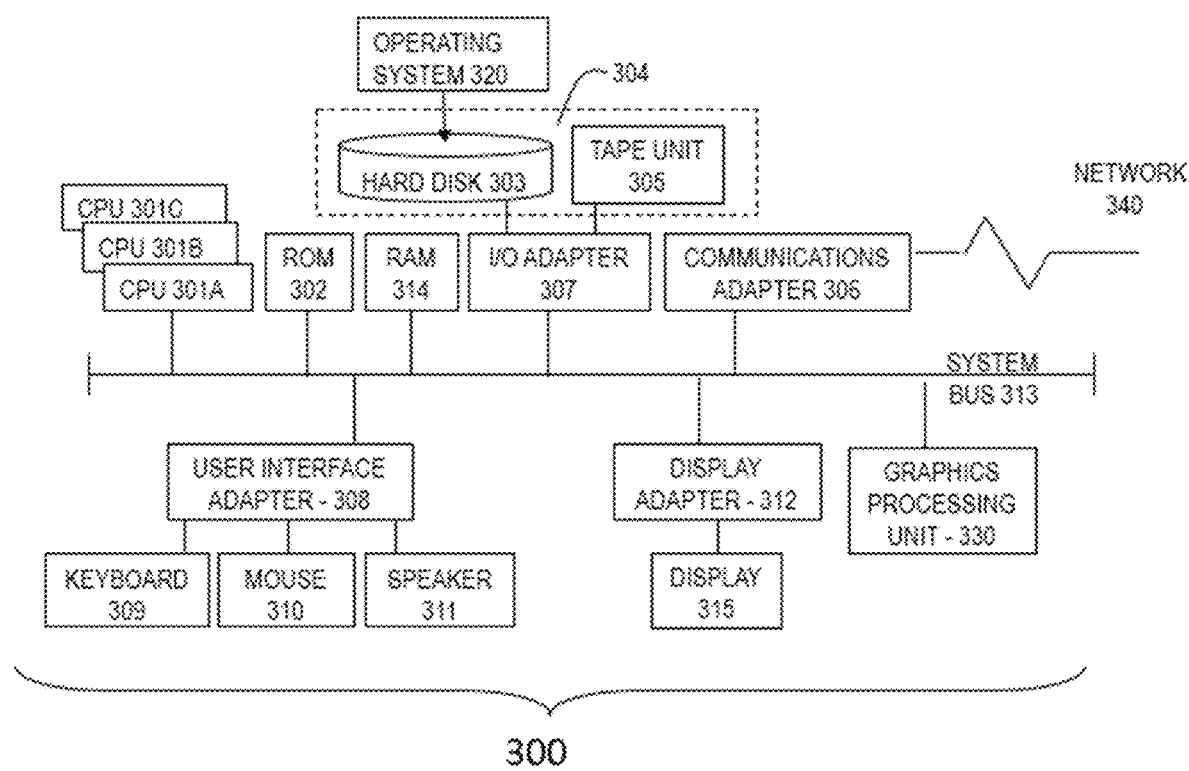
FIG. 3 depicts a computer/processing system having components and/or functionality for practicing one or more embodiments of the present invention.

FIG. 3 depicts exemplary components of a processing system 300 according to one or more embodiments of the present invention. Any of the elements and functionality of processing system 300 can be included in any of the elements in FIGS. 2-7. Particularly, computer system 102 can implement the elements of processing system 300 to perform the functions discussed herein. The computer system 100 is a processing system. The processing system 300 can include one or more central processing units (processors) 301A, 301B, 301C, etc. (collectively or generically referred to as processor(s) 301). In one or more embodiments, each processor 301 can include a reduced instruction set computer (RISC) microprocessor. Processors 301 are coupled to system memory 314 and various other components via a system bus 313. Read only memory (ROM) 302 is coupled to the system bus 313 and can include a basic input/output system (BIOS), which controls certain basic functions of processing system 300.

FIG. 3 further depicts an input/output (I/O) adapter 307 and a network adapter 306 coupled to the system bus 313. I/O adapter 307 can be a small computer system interface (SCSI) adapter that communicates with a hard disk 303 and/or tape storage drive 305 or any other similar component. I/O adapter 307, hard disk 303, and tape storage device 305 are collectively referred to herein as mass storage 304. Operating system 320 for execution on the processing system 300 can be stored in mass storage 304. The network adapter 306 interconnects bus 313 with an outside network, for example, network 340, enabling data processing system 300 to communicate with other such systems. A screen (e.g., a display monitor) 315 is connected to system bus 313 by display adaptor 312, which can include a graphics adapter to improve the performance of graphics intensive applications and a video controller. In one or more embodiments of the present invention, adapters 307, 306, and 312 can be connected to one or more I/O busses that are connected to system bus 313 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 313 via user interface adapter 308 and display adapter 312. A keyboard 309, mouse 310, and speaker 311 all interconnected to bus 313 via user interface adapter 308, which can include, for example, a Super I/O chip integrating multiple device adapters into a single integrated circuit.

In exemplary embodiments, the processing system 300 includes a graphics processing unit 330. Graphics processing unit 330 is a specialized electronic circuit designed to manipulate and alter memory to accelerate the creation of images in a frame buffer intended for output to a display. In general, graphics processing unit 330 is very efficient at manipulating computer graphics and image processing and has a highly parallel structure that makes it more effective than general-purpose CPUs for algorithms where processing of large blocks of data is done in parallel.

Thus, as configured in FIG. 3, the processing system 300 includes processing capability in the form of processors 301, storage capability including system memory 314 and mass storage 304, input means such as keyboard 309 and mouse 310, and output capability including speaker 311 and display 315. In one implementation, a portion of system memory 314 and mass storage 304 collectively store an operating system coordinate the functions of the various components shown in FIG. 3.

The invention is further illustrated by the following non-limiting examples:

EXAMPLES

Example 1: Exemplary SB Precision Curves

FIG. 4 provides exemplary SB precision curves according to the invention for lesions in pancreas 401, liver 402 and lung 403 for a patient. SB1 and SB2 represent different SBs. The precision of different SB (dashed lines) can be compared to the precision of the actual cfDNA sample. The distances between the cfDNA and SBs can be used to determine optimal weights and assess likely lesion and tissue shedding patterns Example 2: Top and Bottom 5% of SB Curves for a Population of Patients FIG. 5 depicts the top and bottom 5% of results for the SB curves for various tissues from a population of patients.

Certain tissues, specifically, pancreas appear to be low DNA shedding, while other tissues, such as liver, appear to be higher DNA shedding. This result shows that certain tissues can be poorly represented in cfDNA or for a given cancer type. Based on this, if it is known the patient has lesions in the pancreas then cfDNA may be a poor representation of the lesion and solid tissue biopsies may be required to monitor changes in the lesion's genomic profile. Similarly, liver's generally high shedding into the cfDNA would suggest fewer liver biopsies are necessary to monitor lesions located there.

Example 3: Exemplary Analysis of Top SBs for a Patient

Figure 6:
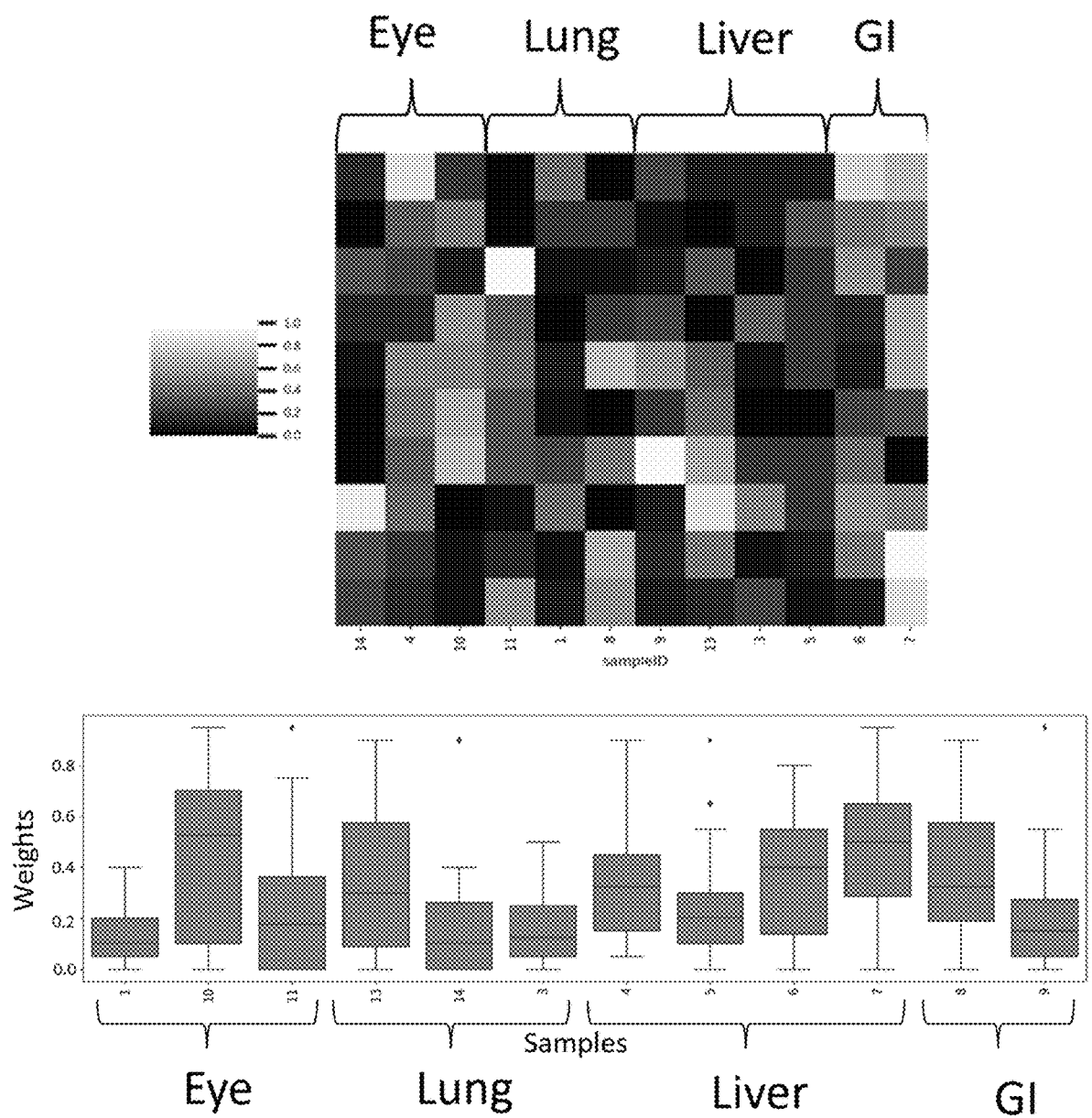
FIG. 6 depicts a heat-map for the top 10 SBs and box plots for the top 500 SBs for a patient determined using methods in accordance with embodiments of the invention.

FIG. 6 on the left shows a heatmap of the different amounts of shedding for the top 10 SBs determined for a patient mapped to the eye, lung, liver and GI. Careful analysis of the top 10 SBs can be used to identify the SF weights that are consistently in the top hypotheses.

FIG. 6 on the right shows box plots of the top 500 synthetic blood samples. Lesions 1, 3 and 9, for example, are low DNA shedding lesions among the top 500 SBs. These lesions might require additional biopsy types for more detailed genomic coverage. Their low DNA shedding can also be associated with lesion resistance to treatment and these low weights can serve as an indicator of their lack of cell death in response to treatment.

Example 4: Changes is DNA Shedding Weights Over Time for a Patient

Figure 7:
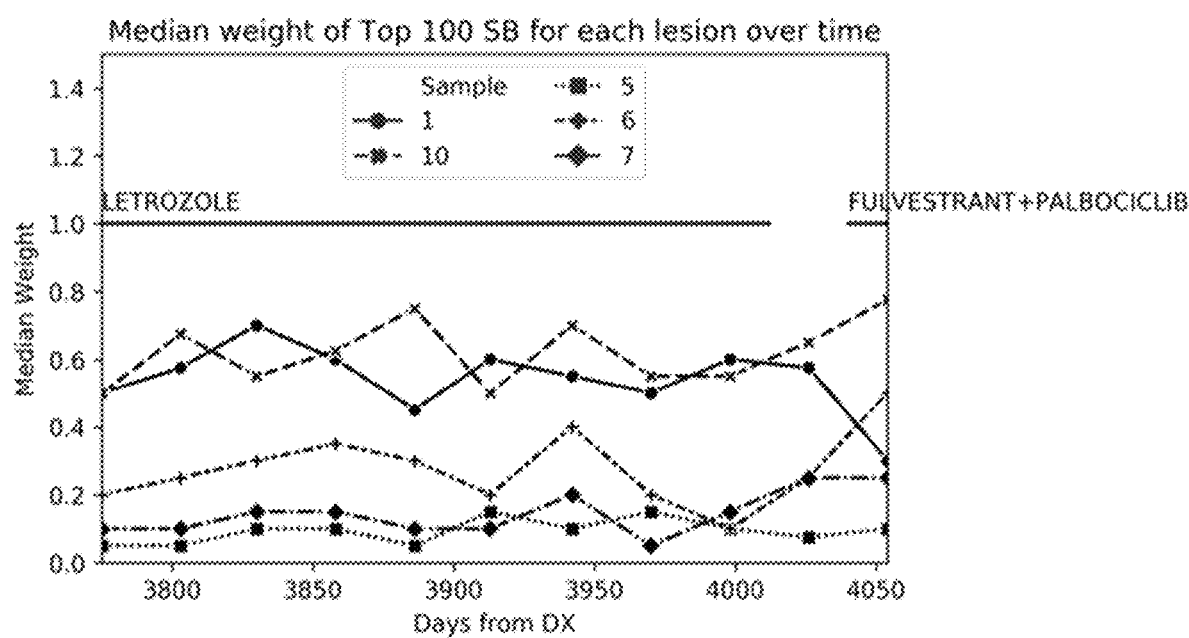
FIG. 7 depicts the changes in DNA shedding weights for a patient over time determined by methods in accordance with embodiments of the invention.

FIG. 7 illustrates changes in median weight of the top 100 SBs for each lesion in a patient over time. The changes in weights can provide an indication of response to treatment. In FIG. 7, The 'x' and '+' line increase once coming off Letrozole and continuing to rise while on Fulvestrant and Palbociclib. The '.' line decreases on Fulvestrant+Palbociclib. The '.' lesion decrease may indicate reduced shedding of the lesion as a result of reduced cell death thus suggesting the lesion is resistant to the Fulvestrant+Palbociclib and another treatment may be needed to eliminate this lesion. Conversely, the 'x' and '+' lesions increased shedding may indicate this treatment is more effective on these sites and causing accelerated cell death resulting in release of more DNA into the fluid.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments described. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

What is claimed is:

1. A computer-implemented method to determine a cell, tissue or a lesion representation in cell-free DNA from a patient, the computer-implemented method comprising:
    obtaining a first and second fluid biopsy samples from the patient;
    inputting, to a processor,
        a cell-free DNA (cfDNA) genomic profile from the first and second fluid biopsy samples from the patient and one or more genomic profiles from one or more cells, tissues or lesions from the patient,
        wherein the cfDNA genomic profile comprises one or more cfDNA genetic markers and their corresponding cancer cell fraction (CCF) in the one or more fluid biopsy samples,
        wherein the genomic profiles from one or more cells, tissues or lesions from the patient comprise the cfDNA genetic markers and their corresponding CCF in the cells, tissues or lesions, and
        wherein the cfDNA genetic markers are single nucleotide polymorphisms;
    constructing, by the processor, a plurality of synthetic fluid hypotheses (SFs), wherein the plurality of SFs comprises 100,000 or more SFs, and wherein each SF is a hypothetical weighted population per cell, tissue or lesion of the one or more cfDNA genetic markers, wherein weights are determined by a random process;
    comparing, by the processor, each of the plurality of SFs to the cfDNA genomic profile to determine goodness of fit, of each of the plurality of SFs to the cfDNA genomic profile;
    selecting, by the processor, a subset of the plurality of SFs, wherein each SF of the subset of the plurality of SFs has a minimum distance in goodness of fit compared to the cfDNA genomic profile;
    outputting, by the processor, based on the subset of the plurality of SFs, a cell, tissue or a lesion representation in the cfDNA of the patient, wherein the representation correlates the subset of the plurality of SFs with the one or more genomic profiles from the one or more cells, tissues or lesions from the patient to determine the cell, tissue or the lesion representation in the cfDNA of the patient;
    using the cell, tissue or the lesion representation in the cfDNA of the patient to assess patient response to a treatment plan by longitudinal monitoring at a lesion level by identifying an initial response of a lesion to the treatment plan prior to the standard assessment grace period for imaging response evaluation of 3 months, wherein the initial response includes a change in the cell, tissue or a lesion representation in the cfDNA of the patient,
    wherein the treatment plan is a cancer treatment regimen including at least one subsequent fluid biopsy, the subsequent fluid biopsy being subsequent to the longitudinal monitoring, and one of administration of a chemotherapeutic agent, radiation therapy, surgery, chemotherapy, targeted therapy, hormone therapy, immunotherapy, stem cell transplant, or a combination thereof;
    the initial response including at least one lesion of the one or more cells, tissues or lesions having a representation in the cfDNA below a threshold, and
    altering the treatment plan by altering the at least one subsequent fluid biopsy to being at least one subsequent solid tumor biopsy of the lesion of the one or more cells; and
    performing the subsequent solid tumor biopsy of the lesion of the one or more cells, tissues or lesions.

2. The computer-implemented method of claim 1, wherein the fluid biopsy sample is a blood biopsy sample, a pleural fluid biopsy sample, or an ascites fluid biopsy sample.

3. The computer-implemented method of claim 1, further comprising, by the processor, determining goodness of fit using L-infinity and L1 distances in recall and precision curves when selecting the subset of SFs.

4. The computer-implemented method of claim 1, wherein constructing, by the processor, the plurality of SFs, comprises
generating, by the processor, a plurality of random alphas, wherein each alpha represents the contribution of the one or more cells, tissues or lesions in the fluid biopsy sample;
inputting the plurality of alphas, by the processor, to a random distribution function and generating, by the processor, a weight for each of the one or more cfDNA genetic markers,
discarding, by the processor, cell, tissue, or lesion genetic markers having a frequency less than a set value; and
augmenting, by the processor, the SFs with genetic markers found exclusively in the cfDNA genomic profile to construct, by the processor, the SFs.

5. The computer-implemented method of claim 4, wherein generating, by the processor, a weight for each of the one or more cfDNA genetic markers, further comprises assigning weights for each of the one or more cfDNA genetic markers to low, medium and high frequency bins; associating each alpha with a low, medium or high frequency bin; and assigning each alpha a random weight from its low, medium or high frequency bin, wherein each bin comprises an interval range of weights or a discrete weight.

6. The computer-implemented method of claim 1, wherein comparing, by the processor, each of the plurality of SFs to the cfDNA genomic profile to determine the goodness of fit of each of the plurality of SFs, comprises
applying, by the processor, distances with respect to recall and precision curves for the representation of the one or more cfDNA genetic markers in the plurality of SFs, and
repeating, by the processor, the applying, 1 to 4 times.

7. The computer-implemented method of claim 1, wherein the subset of SFs comprises 10 to 500 SFs, or the top 1% to 10% of SFs having the minimum distance in recall and precision compared to the cfDNA genomic profile.

8. The computer-implemented method of claim 1, further comprising,
repeating, by the processor, the computer-implemented method to provide a plurality of cell, tissue or a lesion representation in the cfDNA of a plurality of patients, and
determining, by the processor, from the lesion representation in the cfDNA of a plurality of patients a likelihood of cell, tissue or lesion representation of an identified cfDNA genetic marker.

9. The computer-implemented method of claim 1, wherein the first fluid biopsy is taken at a first time and the second fluid biopsy is taken at a second time; and
determining, by the processor, a first time cell, tissue or a lesion representation in the cfDNA of the patient and a second time cell, tissue or a lesion representation in the cfDNA of the patient according to the computer-implemented method; and
comparing, by the processor, the first time representation to the second time representation to determine a time-dependent change in the cfDNA of the patient.

10. The computer-implemented method of claim 1, wherein the one or more lesions are tumors in different tissues or organs of the patient, wherein the tissue is a transplanted tissue in the patient, or wherein the cell is a transplanted chimeric cell.

11. The computer-implemented method of claim 1, wherein the longitudinal monitoring provides information for treatment development comprising efficacy of drug delivery to different sites, or associating specific lesion genetic profiles to their treatment response by measuring their change in cfDNA representation.

12. The computer-implemented method of claim 1, wherein the assessing patient response to the treatment plan allows revealing a true lesion response and further influencing a subsequent treatment plan.

13. The computer-implemented method of claim 1, wherein the cancer treatment further comprises administration of a signal transduction pathway inhibitor, an antimetabolite, an antimicrotubule agent, an alkylating agent, a nitrogen mustard, a nitrosourea, a platinum agent, an anthracycline, an antibiotic, a topoisomerase inhibitor, an alkyl sulfonate, a triazine, an ethylenimine, a folic acid analog, a pyrimidine analogue, a purine analog, an antitumor antibiotic, a hormone, an anti-angiogenic agent, an immunotherapeutic agent, a cell cycle signaling inhibitor, or a combination thereof.

* * * * *